Figure 1:
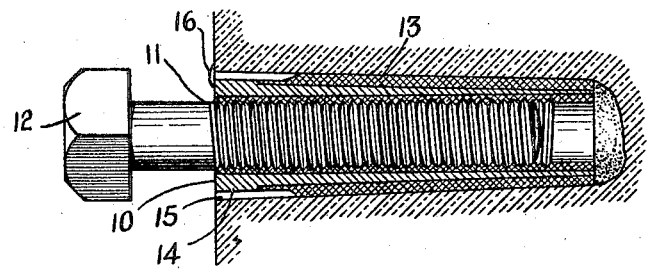

J. KENNEDY.
WALL SOCKET.
APPLICATION FILED MAR. 9, 1915.

1,229,287.

Patented June 12, 1917.

WITNESSES:

INVENTOR
Joseph Kennedy
BY
E. W. Marshall
ATTORNEY

UNITED STATES PATENT OFFICE.

JOSEPH KENNEDY, OF NEW YORK, N. Y., ASSIGNOR TO THE CLEMENTS COMPANY, OF NEW YORK, N. Y., A CORPORATION OF NEW YORK.

WALL-SOCKET.

1,229,287.  Specification of Letters Patent.  Patented June 12, 1917.

Original application filed August 14, 1913, Serial No. 784,672. Divided and this application filed March 9, 1915. Serial No. 13,166.

*To all whom it may concern:*

Be it known that I, JOSEPH KENNEDY, a citizen of the United States of America, and a resident of New York, county and State of New York, have invented certain new and useful Improvements in Wall-Sockets, of which the following is a specification, reference being had to the accompanying drawing, forming a part thereof.

My invention relates to wall sockets or plugs such as are inserted in walls, floors or other structures of material which will not readily receive and hold the threads of a bolt, for the purpose of forming anchorage members for bolts or the like, and its object is to provide a simple device which will be securely held in a hole into which it is driven.

This and other objects and advantages of my invention will appear in the following specification, in which the invention will be described and its novel features will be set forth in appended claims.

Referring to the drawings:

Figure 1 is a transverse section of a wall having a hole drilled therein with the bolt screwed into one of my novel wall sockets within the hole.

Figure 2:
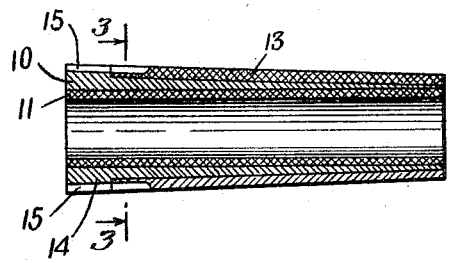
Figure 3:
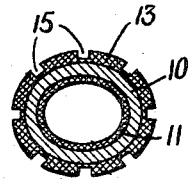

The wall socket is shown respectively in longitudinal and transverse section in Figs. 2 and 3, in the condition in which it appears when ready for use, the section of Fig. 3 being taken on the line 3—3 of Fig. 2.

The wall socket comprises a hollow shell 10 which is circumferentially continuous and is elliptical in cross-section. The purpose of this shape is first to provide a socket which will not rotate in a recess when a bolt is being inserted or withdrawn, and second, to provide a bore which when provided with a soft metal lining, will permit an inserted screw to cut in its own threads, the parts of the bore of the larger diameter forming clearance for the displaced metal. The shell is provided with a lining 11 of soft metal into which the bolt, such as the bolt 12 of Fig. 1, may cut its own threads. The outside of the shell is longitudinally tapered, being thicker at its outer end and has a soft metallic cover sleeve 13 of uniform thickness. The shell is provided with an end flange 14 having grooves 15 which are cut through it in a longitudinal direction and extend part way into the cover sleeve.

These grooves are provided so that after the sockets are embedded in the wall, as shown in Fig. 1, nails or wedges, such as 16, may be driven into them between the outer end of the socket and the surface of the hole. The elliptical exterior prevents the rotation of the socket in the hole.

This application is a divisional of application Serial No. 784,672, filed by me on the 14th of August, 1913, and which has been assigned to The Clements Co., a corporation of the State of New York.

What I claim is:

1. A wall socket comprising a hollow circumferentially continuous sleeve of hard metal, an external flange at the outer end thereof, a similar sleeve of soft metal surrounding the unflanged portion of the hard metal sleeve, said socket being provided with longitudinally disposed grooves passing through said flange and into the outer portion of the soft metal sleeve.

2. A wall socket comprising a hollow circumferentially continuous sleeve of hard metal, the cross-section of which is a curved plane of non-uniform diameter, an external flange at the outer end thereof, a similar sleeve of soft metal surrounding the unflanged portion of the hard metal sleeve, said socket being provided with longitudinally disposed grooves passing through said flange and into the outer portion of the soft metal sleeve for a part of its length and means within said sleeve for receiving the thread of a bolt.

3. A wall socket comprising a hollow circumferentially continuous tapered sleeve of hard metal, the cross-sections of which are curved planes of non-uniform diameter, an external flange at the outer end thereof, a lining of soft metal adapted to receive the threads of a bolt, an outer covering of soft metal surrounding the unflanged portion of the sleeve, said socket being provided with longitudinally disposed grooves passing through the flange and into the outer portion of said outer covering for a part of its length.

4. A wall socket comprising a hollow circumferentially continuous sleeve of hard metal, the outer surface of which is tapered, an external flange at the outer end of said sleeve, an external sleeve of soft metal surrounding the unflanged portion of the hard metal sleeve, said socket being provided with longitudinally disposed grooves passing through said flange and into the outer portion of the soft metal sleeve.

In testimony whereof, I have hereunto set my hand in the presence of two subscribing witnesses, this 3rd day of March, 1915.

JOSEPH KENNEDY.

Witnesses:
I. B. MOORE,
E. G. SCHOENIG.

Copies of this patent may be obtained for five cents each, by addressing the "Commissioner of Patents, Washington, D. C."